United States Patent
Yamada et al.

(10) Patent No.: US 10,523,097 B2
(45) Date of Patent: Dec. 31, 2019

(54) ELECTRICAL CONDUCTOR ALIGNING METHOD

(71) Applicant: HONDA MOTOR CO., LTD., Tokyo (JP)

(72) Inventors: Mitsuhiro Yamada, Tochigi (JP); Yutaka Matsumoto, Tochigi (JP); Toru Yoshida, Tochigi (JP); Kenichi Ohno, Tochigi (JP); Yoshihisa Matsuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 125 days.

(21) Appl. No.: 15/903,151

(22) Filed: Feb. 23, 2018

(65) Prior Publication Data

US 2018/0183307 A1 Jun. 28, 2018

Related U.S. Application Data

(62) Division of application No. 14/413,861, filed as application No. PCT/JP2013/068904 on Jul. 10, 2013, now Pat. No. 9,917,494.

(30) Foreign Application Priority Data

Jul. 12, 2012 (JP) ................................ 2012-156723

(51) Int. Cl.
*H02K 15/085* (2006.01)
*H02K 15/04* (2006.01)

(52) U.S. Cl.
CPC .......... *H02K 15/085* (2013.01); *H02K 15/04* (2013.01); *H02K 15/0421* (2013.01); *Y10T 29/49117* (2015.01); *Y10T 29/532* (2015.01)

(58) Field of Classification Search
CPC ... H02K 15/04; H02K 15/0421; H02K 15/085
See application file for complete search history.

(56) References Cited

U.S. PATENT DOCUMENTS 2,955,622 A    10/1960   Spotten
3,914,859 A    10/1975   Pierson
(Continued)

FOREIGN PATENT DOCUMENTS

| JP | 2004-072839 | 3/2004 |
| JP | 2004-173357 | 6/2004 |
| JP | 2011-193699 | 9/2011 |

OTHER PUBLICATIONS

International Search Report, dated Aug. 13, 2013 (Aug. 13, 2013).

*Primary Examiner* — Carl J Arbes
(74) *Attorney, Agent, or Firm* — Rankin, Hill & Clark LLP

(57) ABSTRACT

An electrical conductor aligning device that can, without mutual interference, easily, and in a short period of time, align a plurality of electrical conductors in an annular shape while overlapping in the peripheral direction. The coil element aligning device includes: holding sections, a slide mechanism and a cylinder mechanism. One leg of each coil element is held by the plurality of holding sections, the plurality of coil elements being aligned in an annular shape at a spacing such that there is no overlapping in the peripheral direction, and then the plurality of holding sections being moved inwards in the radial direction by the slide mechanism and the cylinder mechanism, thereby aligning the plurality of coil elements in an annular shape while overlapping in the peripheral direction.

7 Claims, 17 Drawing Sheets

(56) References Cited

U.S. PATENT DOCUMENTS

| | | |
|---|---|---|
| 4,901,433 A | 2/1990 | Barrera |
| 5,060,364 A | 10/1991 | Scherer |
| 5,774,976 A | 7/1998 | Stark |
| 6,141,865 A | 11/2000 | Kakutani |
| 2001/0015393 A1* | 8/2001 | Miyazaki ............ H02K 15/045 242/437.3 |

* cited by examiner

ELECTRICAL CONDUCTOR ALIGNING METHOD

TECHNICAL FIELD

The present invention relates to an electrical conductor aligning device and an aligning method thereof. In detail, it relates to an electrical conductor aligning device that aligns a plurality of substantially U-shaped electrical conductors in an annular shape while overlapping in the circumferential direction, and an aligning method thereof.

BACKGROUND ART

The stator coil of a rotating electrical machine is formed in the following way, for example. First, a plurality of electrical conductors molded in a substantially U-shape are aligned in an annular shape while overlapping in the circumferential direction. Next, the legs of each electrical conductor aligned in an annular shape are inserted into the respective slots provided in an annular shape on the stator core. Then, the ends of adjacent legs are connected. The stator coil of a rotating electrical machine is thereby formed.

However, concerning technology for aligning a plurality of substantially U-shaped electrical conductors in an annular shape while overlapping in the circumferential direction, a variety of considerations has been made thus far. For example, a technology has been proposed that inserts one leg of a plurality of substantially U-shaped electrical conductors into a plurality of housing grooves provided on an alignment ring pallet, respectively, and rotates the alignment ring pallet in this state (refer to Patent Document 1). According to this technology, by the plurality of electrical conductors rotating by driving to follow the rotation of the alignment ring pallet, it is said that the plurality of electrical conductors can be aligned in an annular shape while overlapping in the circumferential direction.

Patent Document 1: Japanese Unexamined Patent Application, Publication No. 2004-173357

DISCLOSURE OF THE INVENTION

Problems to be Solved by the Invention

However, with the technology of Patent Document 1, since the plurality of electrical conductors are aligned in sequence while rotating the alignment ring pallet, time is required until the aligning of these completes. In addition, when aligning in order while overlapping the plurality of substantially U-shaped electrical conductors in the circumferential direction, upon aligning the last electrical conductor, interference occurs with the electrical conductors already aligned, and thus alignment becomes difficult.

The present invention has been made taking the above-mentioned problems into account, and an object thereof is to provide an electrical conductor aligning device and aligning method thereof that can align a plurality of electrical conductors in an annular shape while overlapping in the circumferential direction easily and in a short time, without interference therebetween.

Means for Solving the Problems

In order to achieve the above-mentioned object, the present invention provides an electrical conductor aligning device (e.g., the aligning device 1 described later) that aligns a plurality of substantially U-shaped electrical conductors (e.g., the coil elements 10 described later) in an annular shape while overlapping in a circumferential direction, the device including: a plurality of holding sections (e.g., the holding sections 5 described later) provided in an annular shape that holds one leg of each of the electrical conductors; and a moving part (e.g., the slide mechanisms 7, 7A and cylinder mechanism 9 described later) that causes the plurality of holding sections to move in a radial direction, in which the plurality of electrical conductors is aligned in an annular shape while overlapping in the circumferential direction, by aligning the plurality of electrical conductors in an annular shape at intervals not overlapping in the circumferential direction by way of the plurality of holding sections holding one leg of each of the electrical conductors, and then causing the plurality of the holding sections to move to an inner side in the radial direction by way of the moving part.

With the present invention, one leg of each of the substantially U-shaped electrical conductor is held by the plurality of holding sections provided in an annular shape, and thus the plurality of electrical conductors are made to be aligned in an annular shape at intervals so as not to overlap in the circumferential direction. Subsequently, by moving the plurality of holding sections to the inner side in the radial direction by way of the moving part, the plurality of electrical conductors are made to be aligned in an annular shape while overlapping in the circumferential direction.

The plurality of electrical conductors are thereby made to be arranged in an annular shape spreading to a region not interfering with each other, and from there, are made to move to the inner side in the radial direction at almost the same time; therefore, the time required in aligning can be shortened. In addition, since each of the electrical conductors is made to be aligned by moving at almost the same time, it is possible to easily align the plurality of electrical conductors without interfering with each other, irrespective of the sequence of alignment.

In this case, it is preferable for the plurality of holding sections to have positions of adjacent holding sections arranged to be displaced in a central axis (e.g., the central axis X described later) direction of the annular shape.

In addition, with the present invention, the positions of adjacent holding sections are arranged to be displaced in the central axis direction of the ring formed by the plurality of holding sections. It is thereby possible to avoid adjacent holding sections from interfering when causing the plurality of holding sections to move to the inner side in the radial direction.

In addition, in this case, it is preferable for the plurality of holding sections to have adjacent holding sections joined to each other by a link mechanism (e.g., the link mechanism 57 described later), and to be comprised of at least one first holding section (e.g., the first holding section 51 described later) that moves by receiving a direct driving force from the moving part and a plurality of second holding sections (e.g., the second holding sections 52 described later) that follow movement of the first holding section.

With the present invention, along with joining adjacent holding sections to each other by the link mechanism, the plurality of holding sections are configured by at least one of the first holding sections receiving the direct driving force to move from the moving part, and a plurality of the second holding sections that drive following the movement of the first holding section.

Since the adjacent holding sections are thereby joined by the link mechanism, when the first holding section receives the direct driving force to move from the moving part, the second holding sections also move by following this. Therefore, in addition to being able to cause the plurality of holding sections to move almost at the same time easily, the device can be reduced in size, since it is not necessary to provide drive sources to every holding section.

In addition, in this case, it is preferable for the plurality of electrical conductors to be comprised of a first electrical conductor (e.g., the first coil element 11 described later) and a second electrical conductor (e.g., the second coil element 12 described later) of a different shape from the first electrical conductor, and for the plurality of holding sections to respectively hold one leg of the first electrical conductor and one leg of the second electrical conductor.

With the present invention, along with using the first electrical conductor and second electrical conductor which differ in shape from one another as electrical conductors, one leg of the first electrical conductor and one leg of the second electrical conductor are defined as a group, and this is held by the respective holding sections.

Along with being able to more densely overlap the electrical conductors by using two types of electrical conductors which differ in shape from one another, by holding the one leg of each of the two types of electrical conductors by the respective holding sections as a group, it is thereby possible to reduce the number of holding sections compared to a case of providing a holding section for every electrical conductor. As a result thereof, in addition to being able to avoid interference between holding sections, and being able to align the electrical conductors in an annular shape reliably, the device can be reduced in size.

In addition, an electrical conductor aligning method of aligning a plurality of substantially U-shaped electrical conductors (e.g., the coil elements 10 described later) in an annular shape while overlapping in a circumferential direction (e.g., the aligning method executed by the aligning device 1 described later) is provided that includes: an arranging step of arranging the plurality of electrical conductors in an annular shape at an interval so as not to overlap in a circumferential direction, by holding one leg of each of the electrical conductors; and an aligning step of aligning the plurality of electrical conductors in an annular shape while overlapping in the circumferential direction, by causing the plurality of electrical conductors arranged in the annular shape to move to an inner side in the radial direction.

The same effects as the above-mentioned invention of an aligning device are obtained according to the present invention.

Effects of the Invention

According to the present invention, it is possible to provide an electrical conductor aligning device and aligning method thereof that can align a plurality of electrical conductors in an annular shape while overlapping in the circumferential direction easily and in a short time, without interference therebetween.

Figure 1:
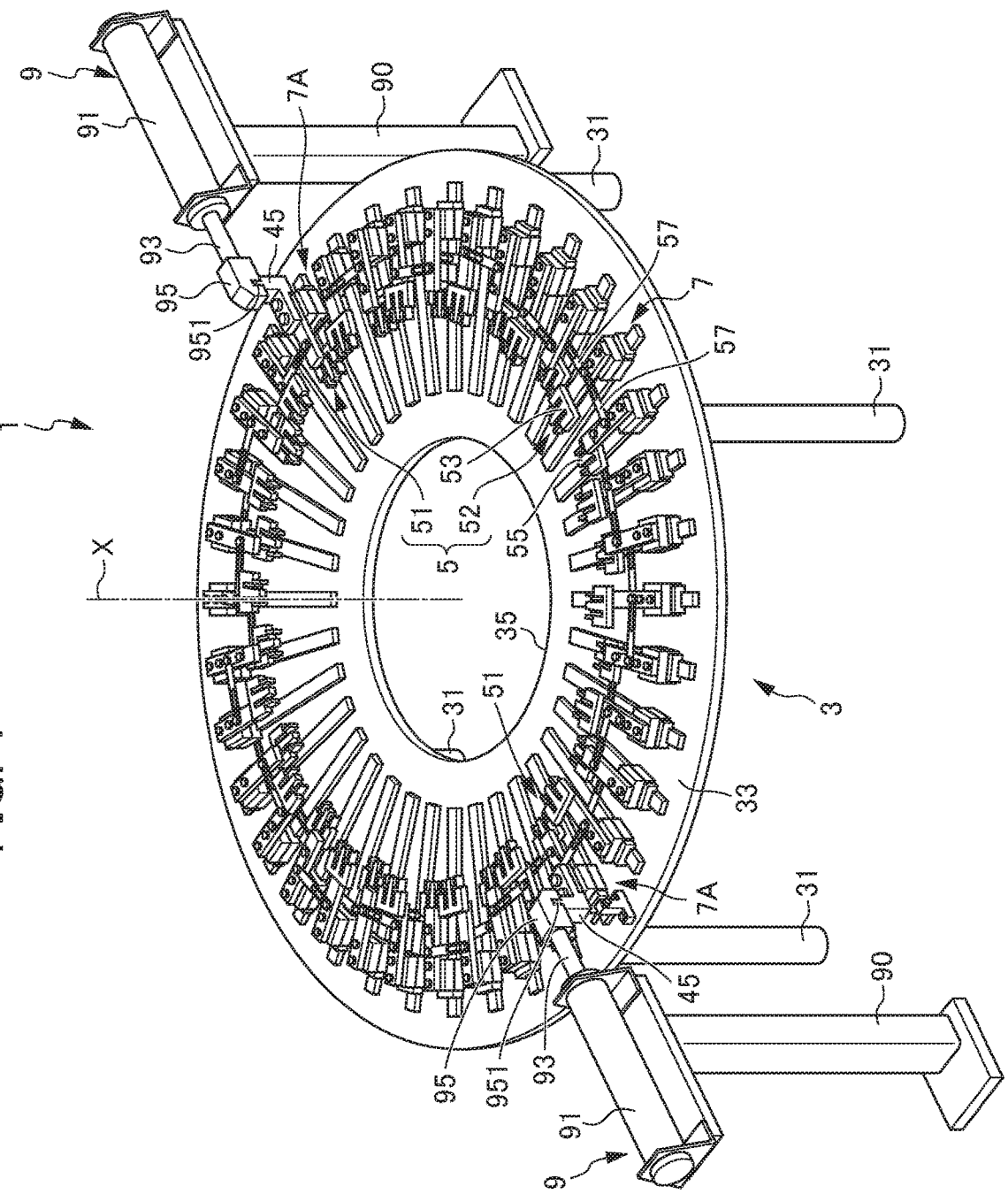
FIG. 1 is a perspective view of an aligning device according to a first embodiment of the present invention.

EXPLANATION OF REFERENCE NUMERALS 1, 2, 3 aligning device
5, 6, 8 holding section
7, 7A slide mechanism (moving part)
9 cylinder mechanism (moving part)
10 coil element (electrical conductor)
11 first coil element (first electrical conductor)
12 second coil element (second electrical conductor)
11A, 12A one lateral face 11B, 12B other lateral face
11C, 12C front face
51 first holding section
52 second holding section
57 link mechanism
631 first hook part (first lateral part)
632 second hook part (second lateral part)
633 rotating part
634 flat part
634A plane
X central axis (central axis of ring)
Y rotation axis

PREFERRED MODE FOR CARRYING OUT
THE INVENTION

Hereinafter, embodiments of the present invention will be explained in detail while referencing the drawings. It should be noted that, in the explanation of a second embodiment, the same reference symbols are appended for configurations that are identical to a first embodiment, and explanations thereof are omitted. In addition, explanations are omitted also for the same operations and effects.

First Embodiment

An aligning device according to the first embodiment of the present invention aligns a plurality of substantially U-shaped coil elements serving as the electrical conductors in an annular shape, while overlapping in the circumferential direction. Herein, the coil elements for rotating electrical machines that are respectively inserted into each slot of a stator core of a rotating electrical machine to form the stator coil by the ends of each other being connected are used as the coil elements.

FIG. 1 is a perspective view showing an aligning device 1 according to the first embodiment of the present invention. As shown in FIG. 1, the aligning device 1 includes a base 3, a plurality of holding sections 5, a plurality of slide mechanisms 7, 7A as movement parts, and two cylinder mechanisms 9, 9 as movement parts.

The base 3 supports the plurality of slide mechanisms 7, 7A described later. The base 3 includes four columnar base legs 31, and an annular-shaped flat part 33 supported by these base legs 31. The diameter of a circular hole 35 in the center of the flat part 33 corresponds to the diameter of the stator core of the rotating electrical machine, and is set to be somewhat larger than the diameter of the stator core, for example. With the aligning device 1 according to the present embodiment, the stator core of the rotating electrical machine that is not illustrated is arranged under the circular hole 35, and an insertion device that is not illustrated for inserting the coil elements aligned by the aligning device 1 into the respective slots of the stator core is arranged between the aligning device 1 and the stator core. It thereby become possible to insert the legs of the plurality of coil elements aligned in an annular shape by the aligning device 1 into the respective slots of the stator core by way of the insertion device.

The plurality of holding sections 5 hold a lower part of one leg of each of the substantially U-shaped coil elements, which are not illustrated. As shown in FIG. 1, the plurality of holding sections 5 is arranged in an annular shape on the flat part 33 of the base 3. In more detail, the plurality of holding sections 5 is respectively supported by the slide mechanisms 7, 7A provided in a radial fashion on the flat part 33 of the base 3, and are made movable in the radial direction by way of the driving force of two cylinder mechanisms 9, 9.

In addition, as shown in FIG. 1, the plurality of holding sections 5 is arranged so that the positions of adjacent holding sections 5 are alternately displaced in the central axis X direction (height direction) of the ring. In more detail, the holding sections 5 are arranged to be alternately displaced in the central axis X direction so as not to be interfering, when the plurality of holding sections 5 advances inwards in the radial direction to meet by way of the slide mechanisms 7, 7A described later.

The plurality of holding sections 5 are configured from two first holding sections 51, 51 that move by receiving direct driving force from the cylinder mechanisms 9, 9 described later, and a plurality of second holding sections 52 that follow the movement of the first holding sections 51, 51. Herein, receiving direct driving force in the present specification indicates receiving the driving force of the cylinder mechanisms 9, 9 not through the link mechanisms described later.

The two first holding sections 51, 51 are arranged to be opposing each other, and are arranged to be displaced lower along the central axis X direction relative to an adjacent second holding section 52. In addition, the plurality of second holding sections 52 are configured from a second upper holding section 53 arranged above, a second lower holding section 55 arranged below, and these are alternately arranged in the circumferential direction.

Among the plurality of holding sections 5, adjacent holding sections 5 are joined to each other by an L-shaped link mechanism 57. The second holding section 52 adjacent to the first holding section 51 is joined to the first holding section 51 by way of this link mechanism 57, and the second holding section 52 joined to this first holding section 51 is joined to an adjacent second holding section 52. By the adjacent second holding sections being sequentially joined in this way, the plurality of second holding sections 52 follow the movement of the first holding section 51. The link mechanism 57 will be described in detail at a later stage.

Figure 2:
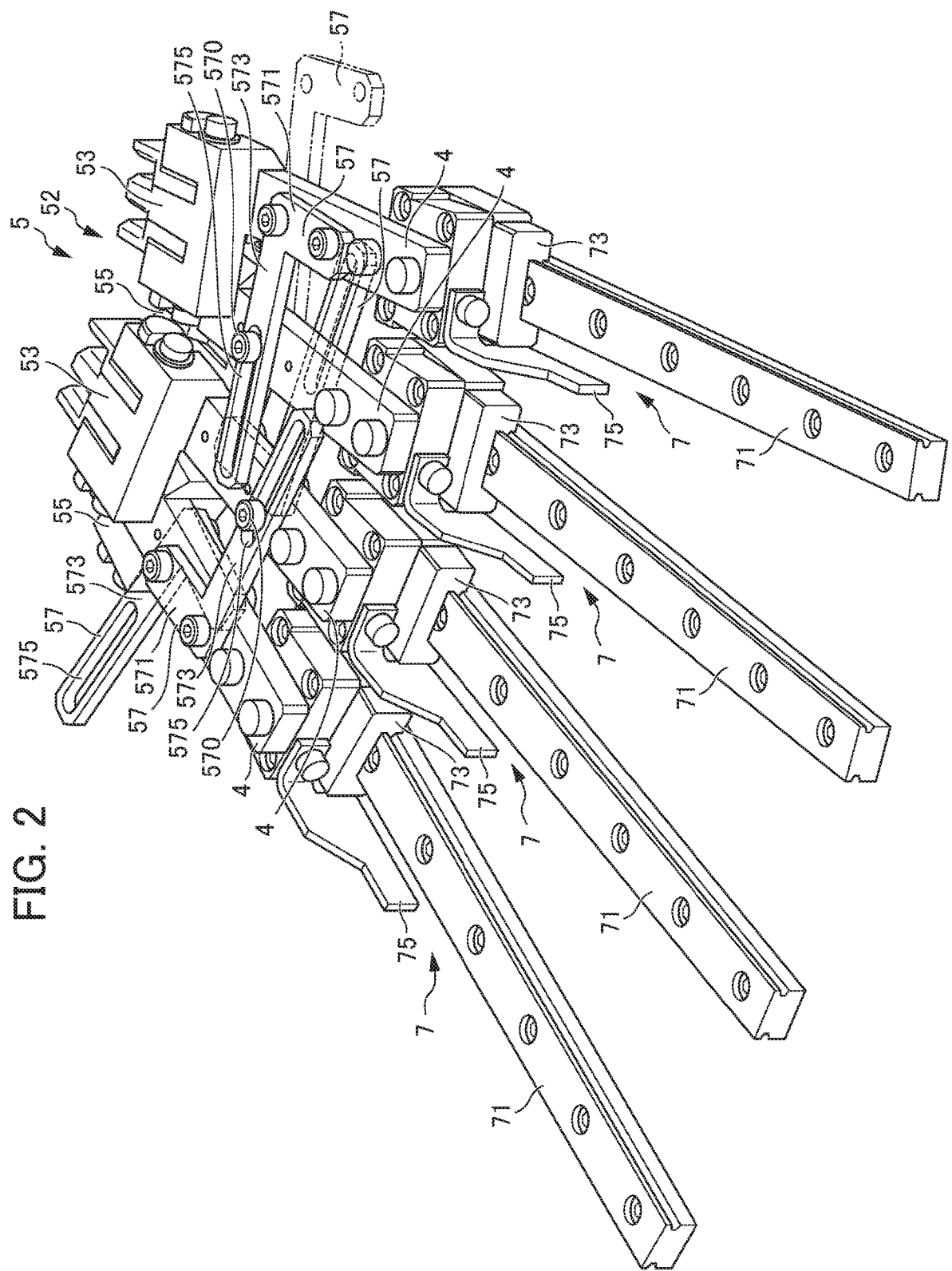
FIG. 2 is a rear perspective view of a second holding section and slide mechanism according to the first embodiment.

FIG. 2 is a rear perspective view of the second holding section 52 and slide mechanism 7 according to the present embodiment. In more detail, FIG. 2 shows the second upper holding section 53 and second lower holding section 55 arranged alternately, and four of the slide mechanisms 7 supporting these holding sections.

As shown in FIG. 2, each of the slide mechanisms 7 is mounted on the flat part 33 of the base 3, and includes a slide rail 71 that extends in the radial direction, a slide guide 73 that engages with the slide rail 71, and a guide plate 75 that is mounted to the slide guide 73 and extends in the radial direction along the slide rail 71. The second upper holding section 53 and second lower holding section 55 are led to the slide guide 73 and guide plate 75 engaging with the slide rail 71 and moving on the slide rail 71, and thus become movable in the radial direction.

The second upper holding section 53 and second lower holding section 55 are both supported by the slide guide 73 via a plate-shaped connection part 4 that is mounted on the top surface of the slide guide 73, respectively, and extends inwards in the radial direction. The connection part 4 is not at the center in the circumferential direction of each holding section, but is joined to one side (right side in FIG. 2), whereby it becomes possible to make the plurality of holding sections 5 to tightly meet.

In addition, the second upper holding section 53 is joined with one adjacent second lower holding section 55 by the link mechanism 57 mounted on the top surface of the connection part 4. At the same time, it is joined to the other adjacent second lower holding section 55 by way of the link mechanism 57 mounted on the bottom surface of the connection part 4.

As shown in FIG. 2, the link mechanism 57 is configured from an L-shaped plate member consisting of a short part 571 and a long part 573 in which an elongated hole 575 is formed; and a bolt 570. In this link mechanism 57, the short part 571 is fixed to one connection part 4. The elongated hole 575 formed in the long part 573 is formed in a width smaller than the diameter of the head of the bolt 570 and slightly larger than the diameter of the shank of the bolt 570. The shank of the bolt 570 is inserted in this elongated hole 575, and the bolt 570 is fixed to the other connection part 4 in a state in which a space is ensured between the long part 573 and the head of the bolt 570. Movement of the bolt 570 in the width direction inside of the elongated hole 575 is thereby regulated, while movement of the bolt 570 in the length direction inside of the elongated hole 570 is permitted. For this reason, the plurality of holding sections 5 become moveable in the radial direction, by following the movement in the radial direction of adjacent holding sections 5.

Figure 3:
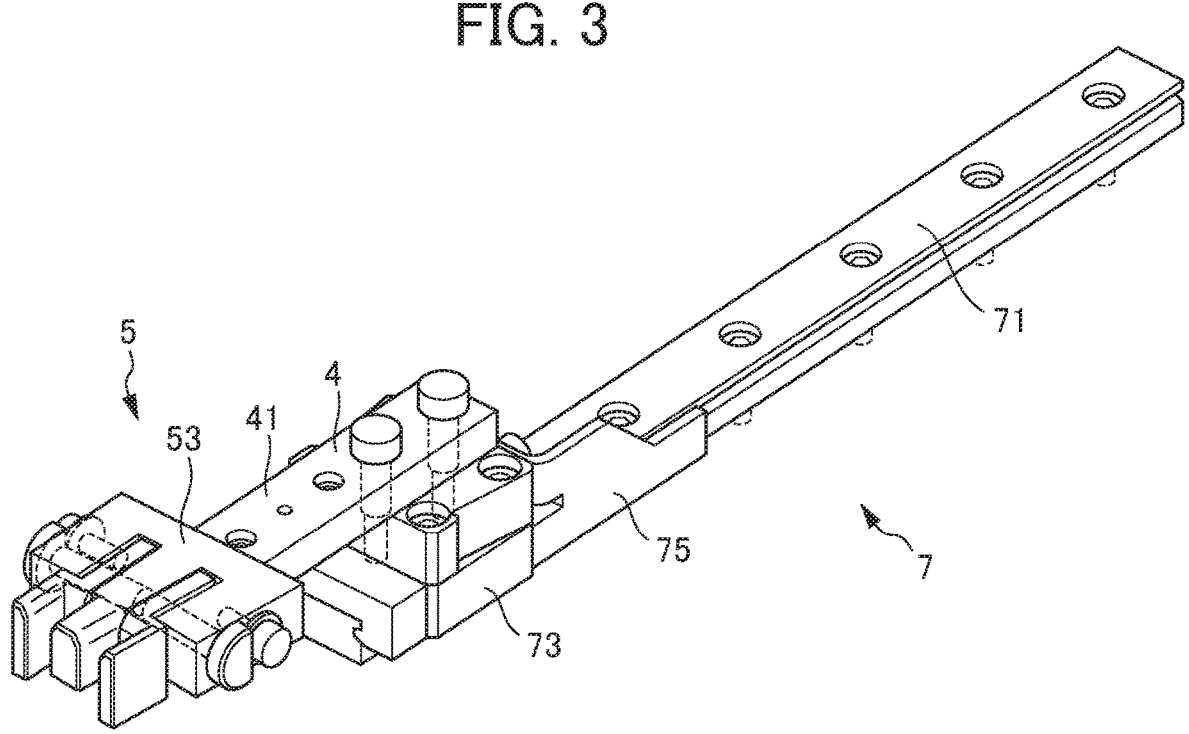
FIG. 3 is front perspective view of a second upper holding section and slide mechanism according to the first embodiment.
Figure 4:
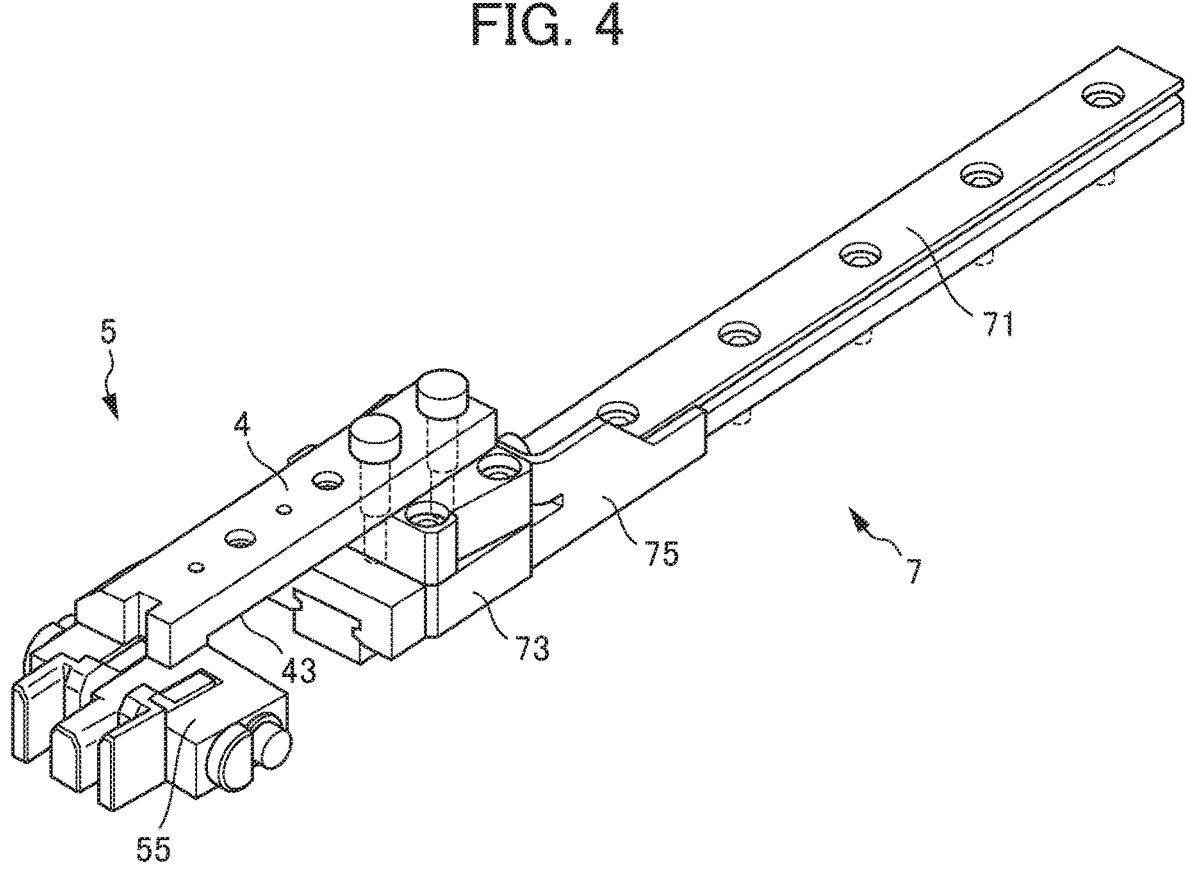
FIG. 4 is a front perspective view of a second lower holding section and slide mechanism according to the first embodiment.

FIG. 3 is a front perspective view of the second upper holding section 53 and slide mechanism 7 according to the present embodiment. In addition, FIG. 4 is a front perspective view of the second lower holding section 55 and slide mechanism 7 according to the present embodiment. As shown in this FIG. 3 and FIG. 4, the second upper holding section 53 is mounted to a top surface 41 side of the connection part 4; whereas, the second lower holding section 55 is mounted to a bottom face 43 side of the connection part 4. The position in the central axis X direction of the second upper holding section 53 and the position in the central axis X direction of the second lower holding section 55 thereby become different positions.

Figure 5:
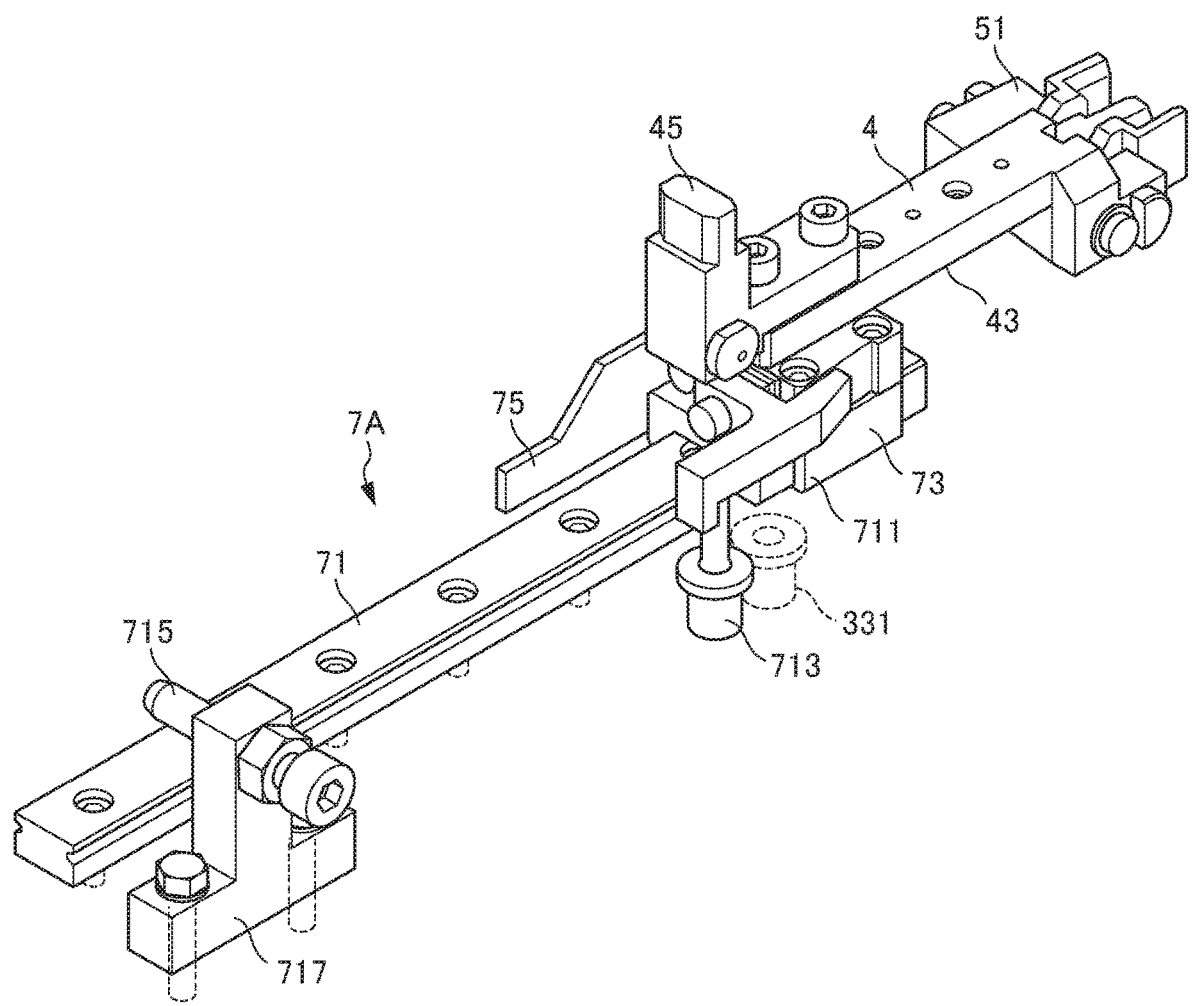
FIG. 5 is a rear perspective view of a first holding section and slide mechanism according to the first embodiment.

FIG. 5 is a rear perspective view of the first holding section 51 and slide mechanism 7A according to the present embodiment. As shown in FIG. 5, the first holding section 51 is the same configuration as the aforementioned second lower holding section 55, and is mounted to the bottom face 43 side of the connection part 4.

The slide mechanism 7A supporting the first holding section 51 is basically the same configuration as the aforementioned slide mechanism 7, and includes the slide rail 71, slide guide 73 and guide plate 75.

However, different from the slide mechanism 7, the slide mechanism 7A further includes a gripped part 45 that is gripped by a gripping part provided to a leading end of a rod of the cylinder mechanism 9 described later. The gripped part 45 is provided to project above the top surface of the connection part 4, and is gripped by fitting into a convex part of the gripping part of the cylinder mechanism 9. The driving force of the cylinder mechanism 9 is thereby transmitted to the slide mechanism 7A supporting the first holding section 51 via the gripped part 45.

In addition, the slide mechanism 7A includes an outside stopper 715 that regulates the movement outwards in the radial direction of the slide guide 73 supporting the first holding section 51. The outside stopper 715 is run in a direction substantially perpendicular to the radial direction, and is fixed on the flat part 33 of the base 3 by a fixing member 717. By this outside stopper 715 abutting the slide guide 73, the movement outwards in the radial direction of the slide guide 73 supporting the first holding section 51 is regulated.

In addition, the slide mechanism 7A includes an inside stopper 713 that regulates the movement inwards in the radial direction of the slid guide 73 supporting the first holding section 51. The inside stopper 713 is run from the bottom surface of the horizontal section 711 is run downwards from the bottom surface of a horizontal part 711 running from the slide guide 73 towards outside in the radiation direction, and abuts from the outer side in the radial direction an inside stopper bolt 331 provided on the flat part 33 of the base 3, whereby the movement inwards in the radial direction of the slide guide 73 supporting the first holding section 51 is regulated.

Figure 6:
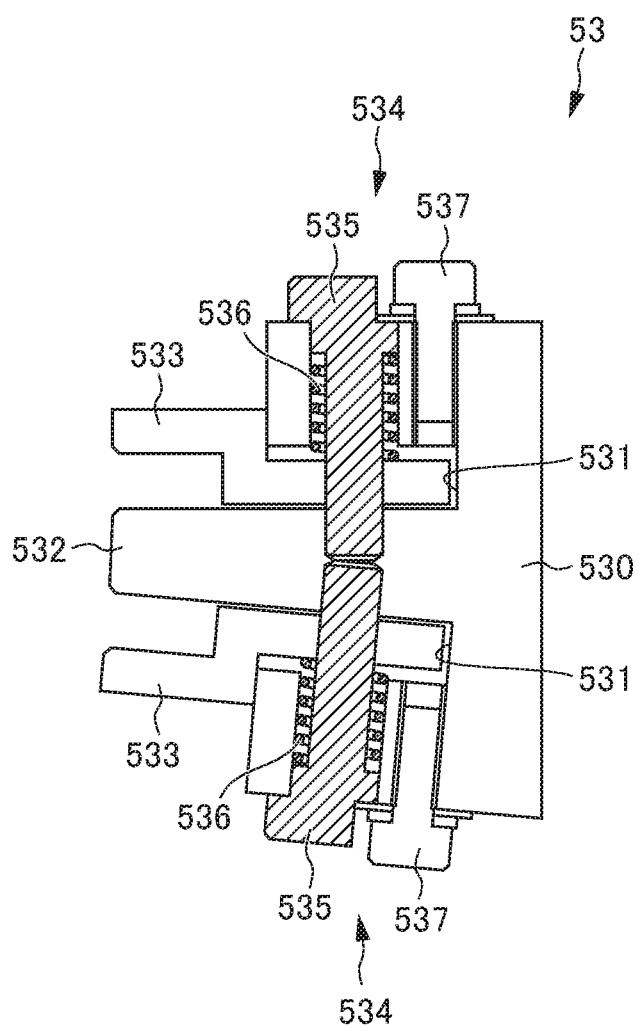
FIG. 6 is a partial cross-sectional plan view of a holding section according to the first embodiment.

FIG. 6 is a partial cross-sectional plan view of a holding section 5 according to the present embodiment. Herein, for the first holding section 51, second upper holding section 53 and second lower holding section 55 constituting the plurality of holding sections 5, the basic configurations thereof are the same as aforementioned, and only differ in being mounted on the upper side or being mounted on the lower side of the connection part 4. Therefore, FIG. 6 shows by giving the second upper holding section 53 as an example, and the configuration of the holding section 5 will be explained in detail by referencing FIG. 6.

As shown in FIG. 6, the second upper holding section 53 includes a holding section main body 530 mounted to the connection part 4, and a pair of hook parts 533, 533 mounted to a leading end side of the holding section main body 530.

In the holding section main body 530, two concave parts 531, 531 which are indented to a base end side, and a projecting part 532 that projects to a leading end side between these concave parts 531, 531 are formed.

Each of the hook parts 533 is mounted to the holding section main body 530 in a state in which the base end side is inserted inside the respective concave parts 531. Each of the hook parts 533 extends by the leading end side spreading, and forms a substantially U-shape with the projecting part 532 provided between the two concave parts 531, 531 of the holding section main body 530, thereby making it possible to insert one leg of the coil element between these.

Each of the hook parts 533 grips one leg of the coil element between the leading end side thereof and the projecting part 532 by way of a pair of chuck mechanisms 534, 534 provided on both side faces of the holding section main body 530. In more detail, one leg of one coil element is gripped between one hook part 533 and the projecting part 532, and one leg of another coil element adjacent to the one coil element is gripped between the other hook part 533 and the projecting part 532. It should be noted that one leg of each coil element is held by configuring so that the other leg of each coil element is not held, and the other leg not held is position more inwards in the radial direction than the one leg that is held.

Each chuck mechanism 534 includes an insertion part 535 and a spring 536. The insertion part 535 has a head on a base end side fixed by a bolt 537 to a lateral face of the holding section main body 530, and the leading end side of the shank penetrates through the base end side of the respective hook parts 533 to be inserted to inside of the projecting part 532. Each insertion part 535 is inserted until the leading ends abut each other. The spring 536 is coiled in a state compressed at the shank of each insertion part 535.

The second upper holding section 53 including the above configuration inserts the leg of the coil element while sliding, between the leading end side of each hook part 533 and the projecting part 532. When this is done, the base end side of each hook part 533 is pushed to spread outwards. At this time, the base end side of each hook part 533 is pressed to the side of the projecting part 532 by way of the strong biasing force of the spring 536. The leg of the coil element is thereby gripped by the force to the side of the projecting part 532 being imparted to the leading end side of each hook part 533.

Referring back to FIG. 1, the two cylinder mechanisms 9, 9 respectively impart a direct driving force on the first holding sections 51 as aforementioned. As shown in FIG. 1, the two cylinder mechanisms 9, 9 are arranged opposite via the base 3. Each of the cylinder mechanisms 9 includes a support base 90, a cylindrical cylinder 91 supported by the support base 90, a piston that is not illustrated, provided to be able to reciprocate inside of the cylinder 91, a rod 93 connected to the piston, and a gripping part 95 provided at the leading end of the rod 93.

To each of the gripping parts 95, a concave part 951 indented upwards is formed in the lower surface side thereof, and each of the concave parts 951 fits to the aforementioned gripped parts 45 that project, whereby the gripped part 45 is gripped by the gripping part 95. The driving force of each of the cylinder mechanisms 9 is thereby transmitted to the slide mechanism 7A supporting the first holding section 51.

By the aligning device 1 according to the present embodiment including the above configuration operating, execution of the aligning method according to the present invention becomes possible. Operation of the aligning device 1 according to the present embodiment will be explained while referencing FIGS. 7 to 11A and 11B.

Figure 7:
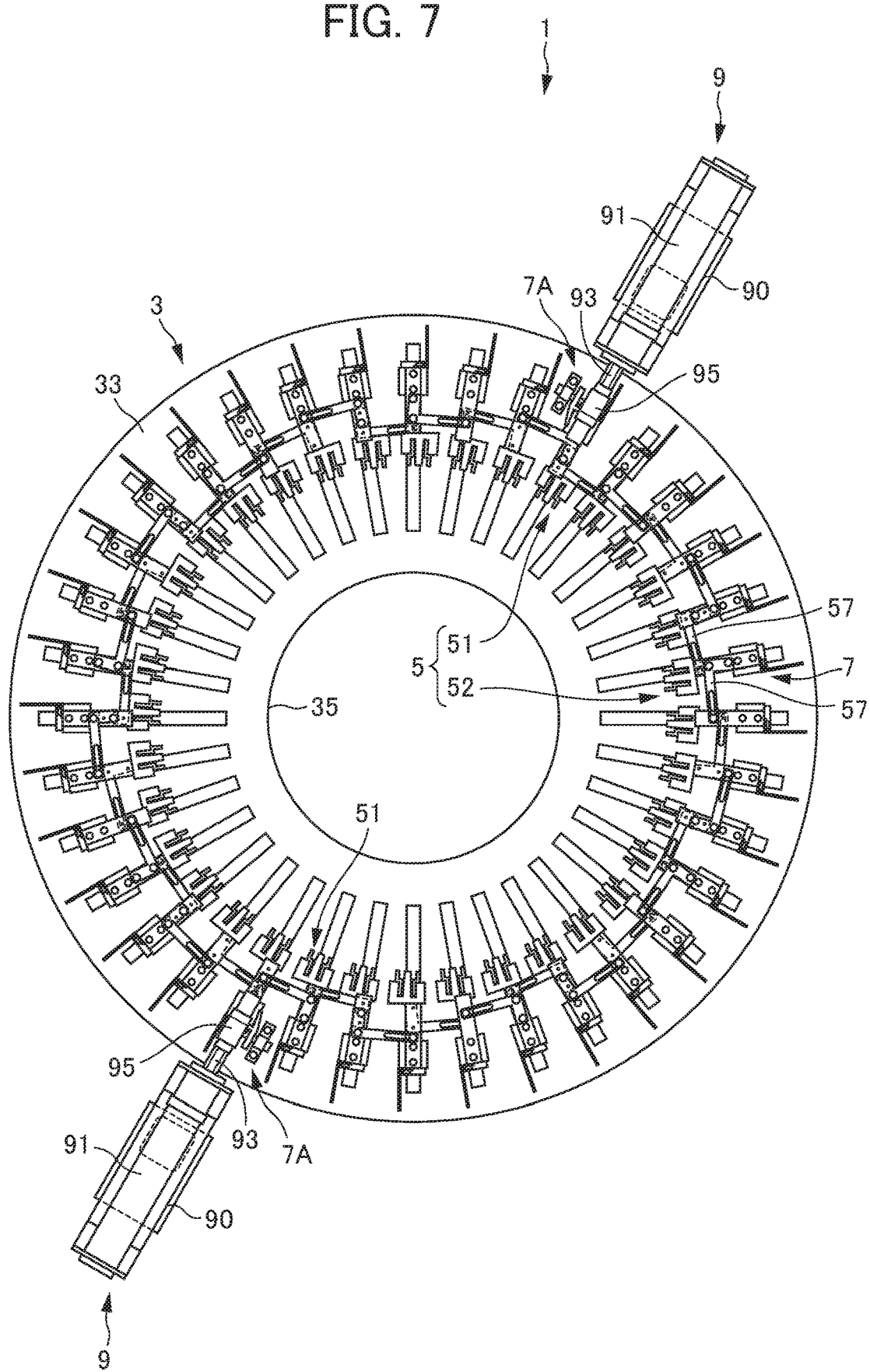
FIG. 7 is a plan view of the aligning device according to the first embodiment, and is a view showing a state when a plurality of holding sections retract to separate to an outer side in the radial direction.
Figure 8:
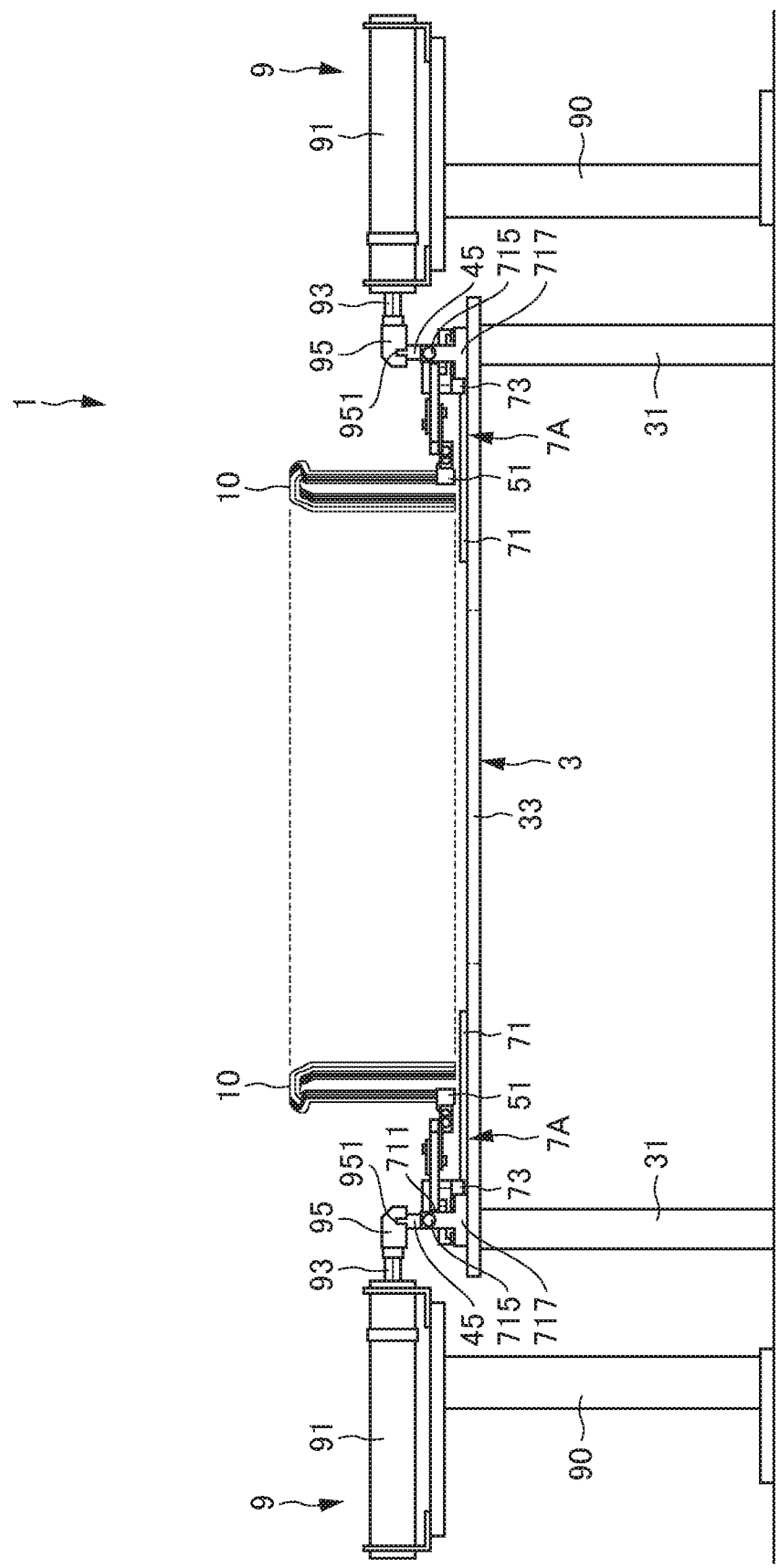
FIG. 8 is a side view of the aligning device according to the first embodiment, and is a view showing a state when a plurality of holding sections retracted to separate to an outer side in the radial direction.
Figure 9:
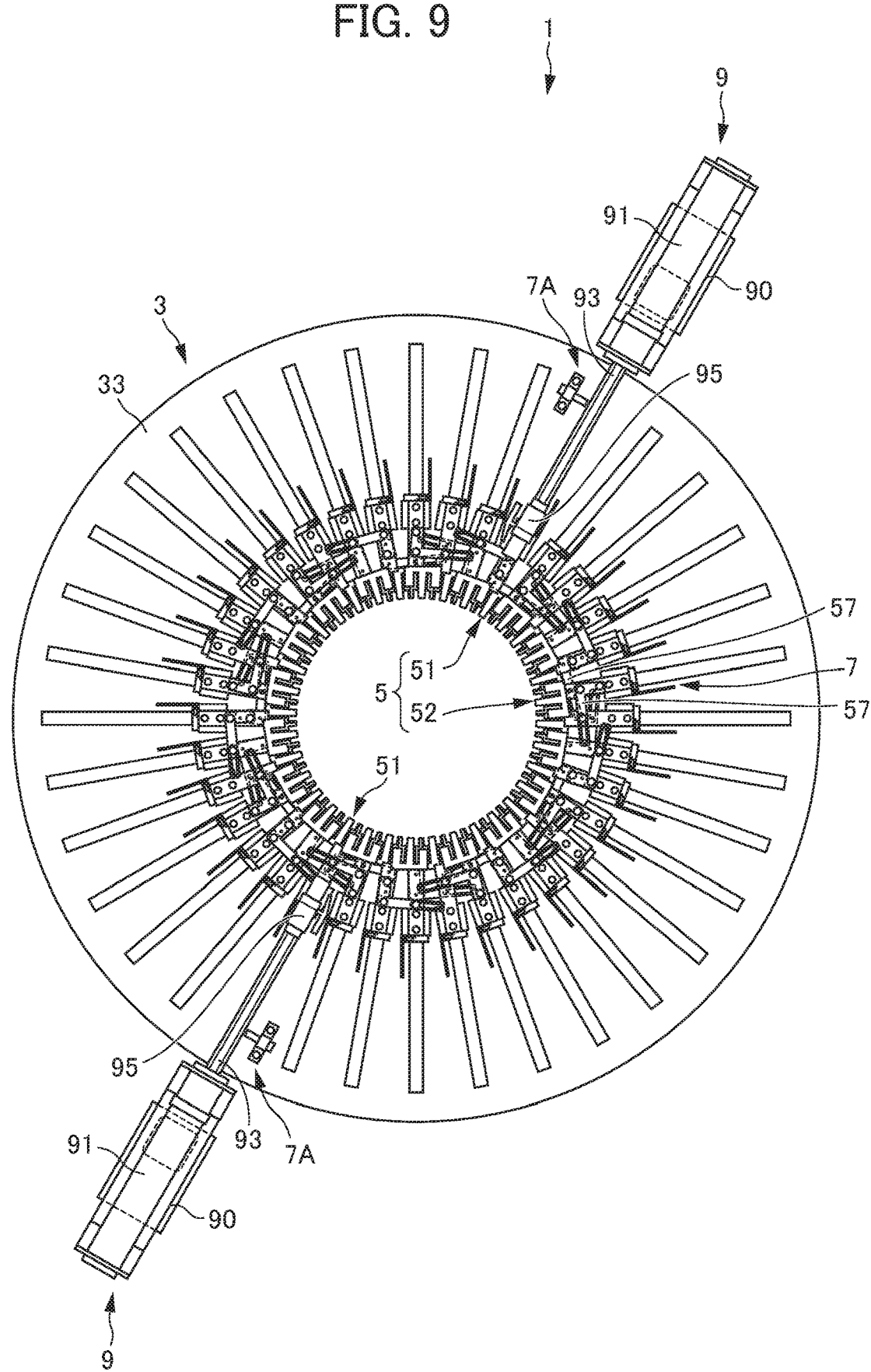
FIG. 9 is a plan view of the aligning device according to the first embodiment, and is a view showing a state when the plurality of holding sections advance to meet at an inner side in the radial direction.
Figure 10:
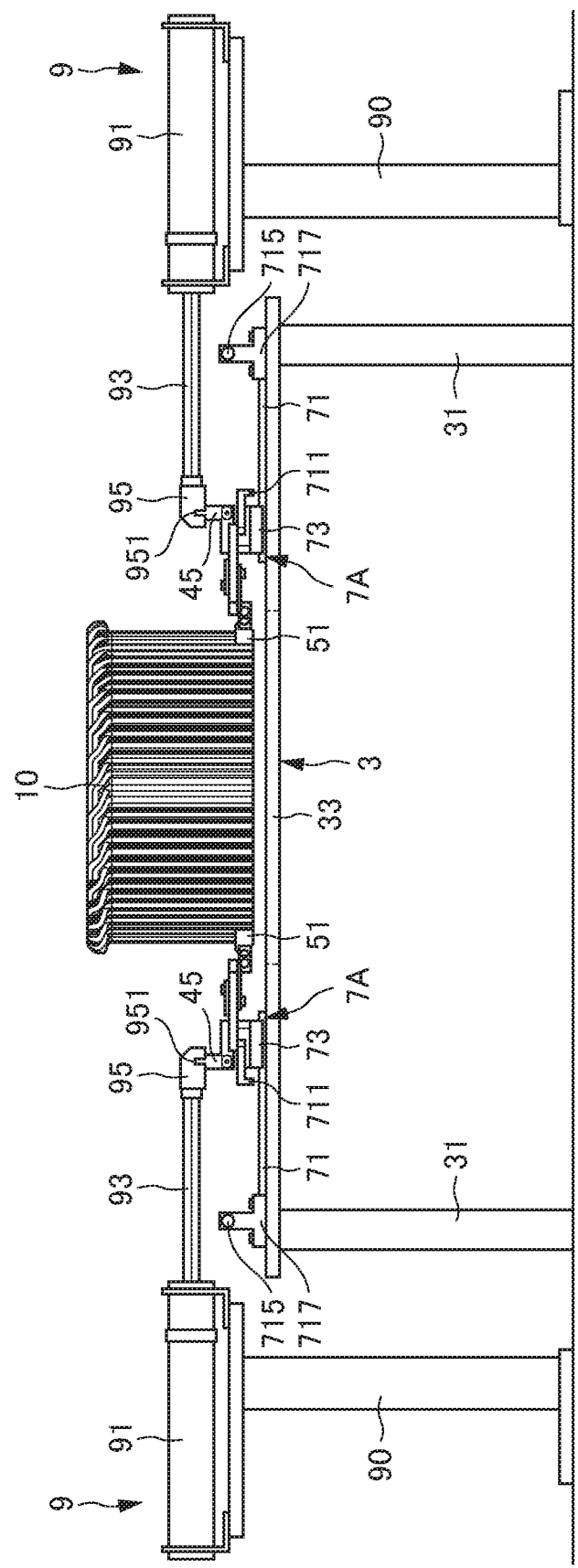
FIG. 10 is a side view of the aligning device according to the first embodiment, and is a view showing a state when the plurality of holding sections advance to meet at an inner side in the radial direction.
Figure 11A:
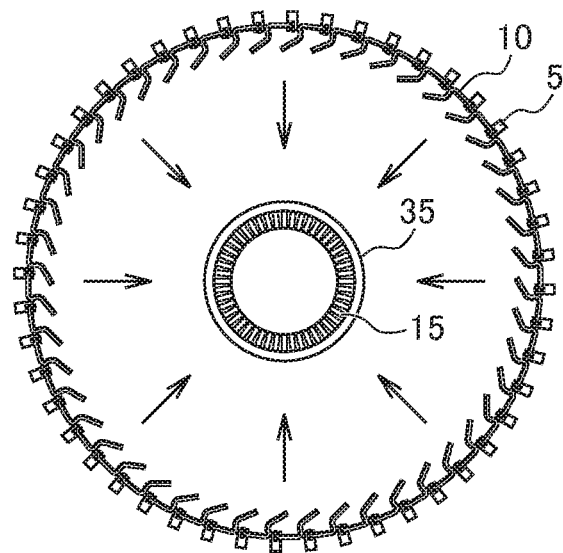
FIG. 11A is a view illustrating an aligning method of coil elements by way of the aligning device according to the first embodiment, and is a view showing a state in which coil elements are aligned in an annular shape at intervals so as not to overlap in the circumferential direction.
Figure 11B:
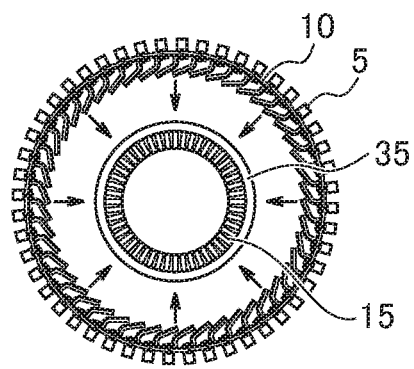
FIG. 11B is a view illustrating an aligning method of coil elements by way of the aligning device according to the first embodiment, and is a view showing a state in which coil elements are aligning in an annular shape while overlapping in the circumferential direction.

Herein, FIGS. 7 and 9 are plan views of the aligning device 1 according to the present embodiment, and FIGS. 8 and 10 are side views of the aligning device 1 according to the present embodiment. FIGS. 7 and 8 are views showing a state when a plurality of holding sections 5 retract to separate to an outer side in the radial direction, and FIGS. 9 and 10 are views showing a state when the plurality of holding sections 5 advance to meet at an inner side in the radial direction. In addition, FIG. 11A is a view illustrating the aligning method of the coil elements 10 by way of the aligning device 1 according to the present embodiment, and is a view showing a state in which the coil elements 10 are aligned in an annular shape at intervals so as not to overlap in the circumferential direction. In addition, FIG. 11B is a view illustrating the aligning method of the coil elements 10 by way of the aligning device 1 according to the present embodiment, and is a view showing a state in which the coil elements 10 are aligning in an annular shape while overlapping in the circumferential direction.

It should be noted that the plan views of FIGS. 7 and 9 omit illustration of the coil elements held by the holding sections 5 as a matter of convenience, and the side views of FIGS. 8 and 10 omit the illustration of parts of the coil elements and holding sections as a matter of convenience. In addition, FIGS. 11A and 11B illustrate together with the stator core 15, which is arranged below the circular hole 35.

First, as shown in FIGS. 7 and 8, the two cylinder mechanisms 9, 9 are driven to retract the first holding sections 51 to an outer side in the radial direction by way of the slide mechanism 7A, until the outside stopper 715 abuts the slide guide 73. When this is done, the second holding sections 52 also follow the movement of the first holding sections 51 by way of the plurality of link mechanisms 57 and slide mechanisms 7 to retract to the outer side in the radial direction. The entirety of the plurality of holding sections 5 thereby enters a state retracted to separate to the outer side in the radial direction.

Next, in this state, the lower part of one leg of each coil element 10 is gripped and held by the respective holding sections 5. As shown in FIG. 11A, the plurality of coil elements 10 are thereby arranged in an annular shape at intervals not overlapping in the circumferential direction. It should be noted that, at this time, the other leg of each of the coil elements 10 is not gripped, and one leg of each of the coil elements 10 is gripped by configuring so that the other leg not being gripped is positioned more inwards in the radial direction than the one leg that is gripped.

Herein, the plurality of coil elements 10 used in the present embodiment consists of one type of coil element, and more specifically, is a substantially U-shaped coil element like that shown in FIG. 8. This coil element 10, for example, is molded by carrying out the following. First, four linear rectangular wires for the coil are made into a bundle, and at substantially the central part thereof, an S-shaped part that assumes a substantially S-shape is molded on a first plane. Next, both legs more to the end sides than the S-shaped part are bent in directions approaching each other. Next, along a second plane that is substantially orthogonal to the first plane, the substantially central part of the S-shaped part is curved while twisting, thereby molding into a mountain shape in which the S-shaped part is made into a substantially summit portion. The substantially U-shaped coil element 10 is thereby obtained.

The coil element 10 obtained in this way is twisted during molding, along with a cross section of the leg being a rectangular shape. For this reason, by gripping one leg between the hook part 533 and projecting part 532 of a U-shape, by configuring so that lateral faces of one leg abut the hook part 533 and projecting part 532, the other leg that is not gripped is automatically arranged more to an inner side in the radial direction than the one leg that is gripped.

Next, as shown in FIGS. 9 and 10, the cylinder mechanisms 9, 9 are made to drive to advance the first holding section 10 to an inner side in the radial direction by way of the slide mechanism 7, until the inside stopper 713 abuts the inside stopper bolt 331. When this is done, the second holding section 52 also follows the movement of the first holding section 51 by way of the plurality of link mechanisms 57 and slide mechanism 7, to advance to the inner side in the radial direction. The entirety of the plurality of holding sections 5 thereby enters a state advanced to meet at the inner side in the radial direction.

At this time, the plurality of coil elements 10 having one leg gripped by the respective holding sections 5 advances to the inner side in the radial direction at almost the same time, as show in FIG. 11B, thereby meeting while overlapping each other in the circumferential direction (corresponding to aligning step of the aligning method according to the present invention). From the above, the plurality of coil elements 10 aligns in an annular shape while overlapping in the circumferential direction.

It should be noted that, as shown in FIG. 9, the diameter of the ring of coil elements 10 aligned in an annular shape is set to be smaller than the diameter of the circular hole 35 formed in the flat part 33 of the base 3. The legs of the coil elements 10 aligned in an annular shape thereby come to be easily inserted into the slots of the stator core 15 arranged below the circular hole 35.

The following effects are exerted according to the aligning device 1 according to the present embodiment.

First, with the present embodiment, one leg of each of the substantially U-shaped coil elements 10 is held by the plurality of holding sections 5 provided in an annular shape, and thus the plurality of coil elements 10 are made to be aligned in an annular shape at intervals so as not to overlap in the circumferential direction. Subsequently, by moving the plurality of holding sections 5 to the inner side in the radial direction by way of the slide mechanisms 7, 7A and cylinder mechanism 9, the plurality of coil elements 10 are made to be aligned in an annular shape while overlapping in the circumferential direction.

The plurality of coil elements 10 are thereby made to be arranged in an annular shape spreading to a region not interfering with each other, and from there, are made to move to the inner side in the radial direction at almost the same time; therefore, the time required in aligning can be shortened. In addition, since each of the coil elements 10 is made to be aligned by moving at almost the same time, it is possible to easily align the plurality of coil elements 10 without interfering with each other, irrespective of the sequence of alignment.

In addition, with the present embodiment, the positions of adjacent holding sections 5 are arranged to be displaced in the central axis X direction of the ring formed by the plurality of holding sections 5. It is thereby possible to avoid adjacent holding sections 5 from interfering when causing the plurality of holding sections 5 to move to the inner side in the radial direction.

In addition, with the present embodiment, along with joining adjacent holding sections 5 to each other by the link mechanisms 57, the plurality of holding sections 5 are configured by at least one of the first holding sections 51 receiving the direct driving force to move from the cylinder mechanism 9, and a plurality of the second holding sections 52 that drive following the movement of the first holding section 51.

Since the adjacent holding sections 5 are thereby joined by the link mechanisms 57, when the first holding section 51 receives the direct driving force to move from the cylinder mechanism 9, the second holding sections 52 also move by following this. Therefore, in addition to being able to cause the plurality of holding sections 5 to move almost at the same time easily, the device can be reduced in size, since it is not necessary to provide drive sources to every holding section 5.

In addition, similar effects as the aforementioned effects are exerted according to the aligning method executed by the aligning device 1 according to the present embodiment.

Second Embodiment

An aligning device 2 according to a second embodiment of the present invention is the same configuration as the aligning device 1 according to the aforementioned first embodiment, except for the point in that the configurations of the holding sections and connection part differ. In addition, although one type of the coil elements 10 are aligned in an annular shape in the first embodiment, the two types of the first coil element and second coil element, which differ in shape from one another, are aligned in an annular shape by the aligning device 2 according to the present embodiment.

Hereinafter, the configuration of the holding section of the aligning device 2 according to the present embodiment will be explained in detail while referencing FIGS. 12 to 15.

Figure 12:
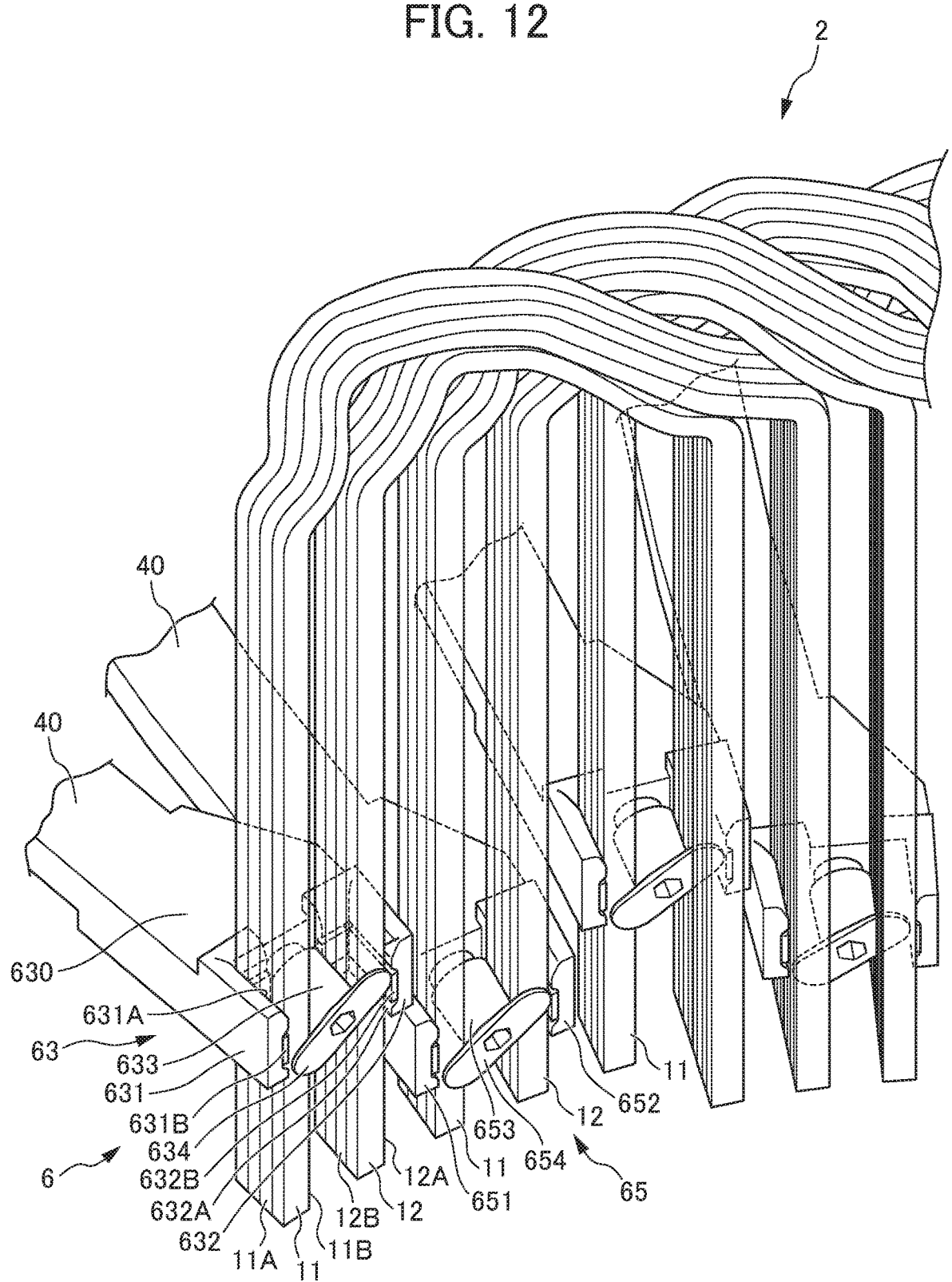
FIG. 12 is a perspective view of holding sections and a first coil element and second coil element held by the holding sections according to a second embodiment of the present invention.

FIG. 12 is a perspective view of holding sections 6 of the aligning device 2 and a first coil element 11 and second coil element 12 held by the holding sections 6 according to the present embodiment. In more detail, FIG. 12 is a perspective view of the first coil elements 11 and second coil elements 12 held by the second upper holding sections 63 and second lower holding sections 65 constituting the plurality of holding sections 6.

As shown in FIG. 12, the holding sections 6 are integrally molded to the leading end side of the connection part 40. In addition, the basic configurations of the first holding section 61 (not illustrated), second upper holding section 63 and second lower holding section 65 constituting the plurality of holding sections 6 are the same, and the point of only differing in being mounted to an upper side or mounted to a lower side of the connection part 4 is the same as the first embodiment. More specifically, the first holding section 61 and the second lower holding section 65 are mounted to the lower side of the connection part 4, and the second upper holding section 63 is mounted to the upper side of the connection part 4. Therefore, FIGS. 12 to 15 are illustrated giving the second upper holding section 63 as an example, and the configuration of the holding section 6 will be explained in detail by referencing FIGS. 12 to 15.

Herein, the first coil element 11 and second coil element 12 both are substantially U-shaped coil elements molded in a mountain shape in which the S-shaped part is a substantially summit portion, by curving while twisting the substantially central part of the S-shaped part, similarly to the aforementioned coil element 10. However, the second coil element 12 is a U shape that is smaller than the first coil element 11, and is molded so that the second coil element 12 fits together in the inner circumference of the first coil element 11.

As shown in FIG. 12, the aligning device 2 according to the present embodiment is made with one leg of the first coil element 11 and one leg of the second coil element 12 as a group, and holds this with each of the holding sections 6. More densely aligning the first coil element 11 and second coil element 12 alternately in the circumferential direction thereby becomes possible.

The second upper holding section 63 includes a holding section main body 630 mounted to the connection part 4, and a first hook part 631 and second hook part 632 serving as a first lateral part and second lateral part provided to a leading end side of the holding section main body 630.

The holding section main body 630 is formed so as to become gradually wider in width at one end side from the base end side towards a leading end side. The first hook part 631 and second hook part 632 are integrally molded at both end sides of the leading end face of the holding section main body 630, and the holding section main body 630, first hook part 631 and second hook part 632 are an integrated structure.

The first hook part 631 and second hook part 632 are respectively formed in a substantially L shape in a plan view, and are provided so that the inner faces of each oppose each other. Each hook part has a short part integrally molded at one end side of the leading end face of the holding section main body 630, and a long part that is provided to extend to a leading end side.

During operation as shown in FIG. 12, one lateral face 11A of one leg of the first coil element 11 abuts an inner face 631A of the first hook part 631 serving as a first lateral part. Similarly, a lateral face 12A of one leg of the second coil element 12 abuts an inner face 632A of the second hook part 632 serving as a second lateral part.

In addition, the second upper holding section 63 includes a rotating part 633 and flat part 634 at a central part of a leading end face of the holding section main body 630, as a chuck mechanism.

Figure 13:
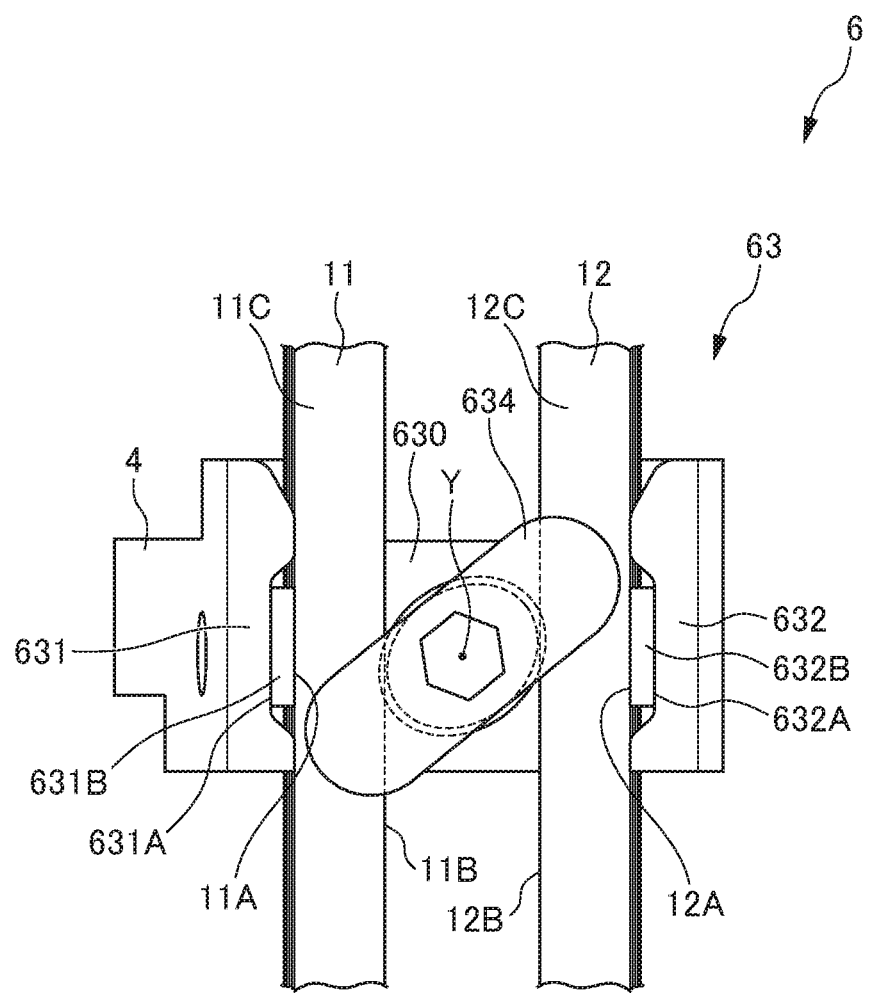
FIG. 13 is a view when looking at the holding section according to the second embodiment from an inner side in the radial direction.
Figure 14A:
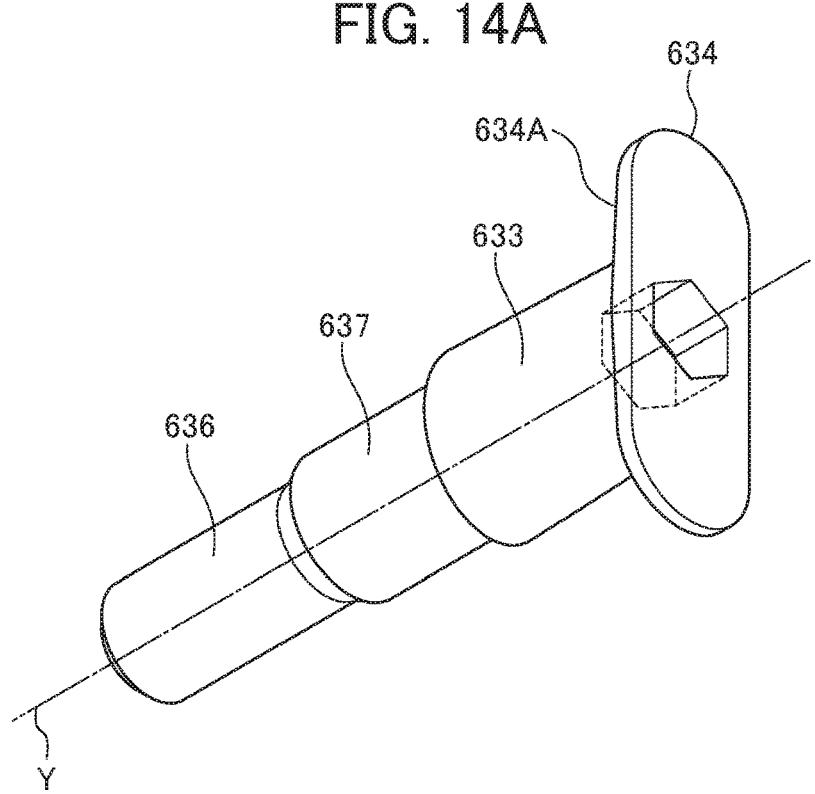
FIG. 14A is a front perspective view showing the configurations of a rotating part and flat part of the holding section according to the second embodiment.
Figure 14B:
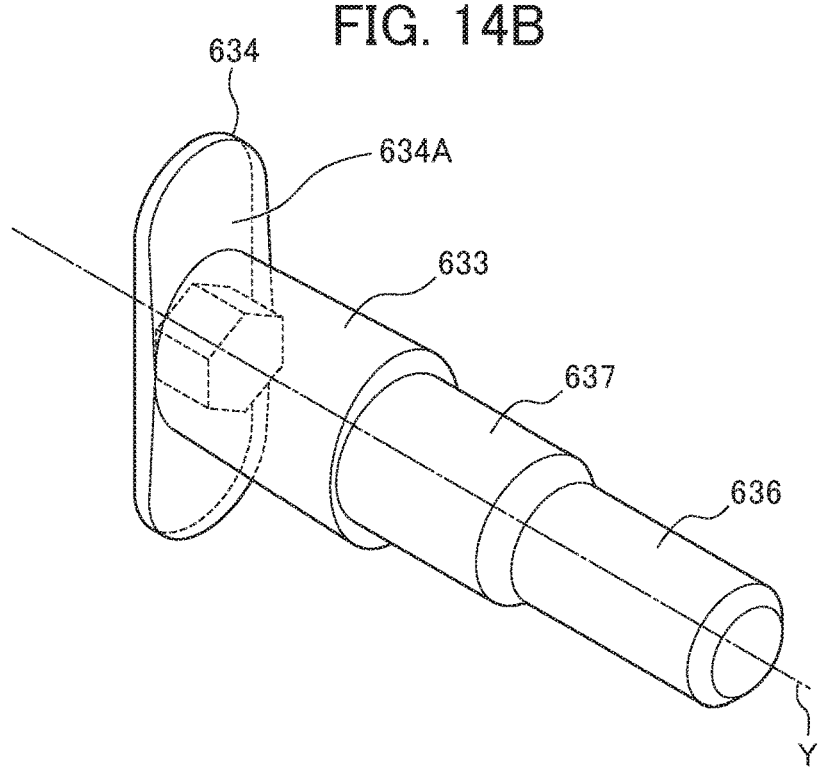
FIG. 14B is a rear perspective view showing the configurations of the rotating part and flat part of the holding section according to the second embodiment.

FIG. 13 is a view looking at the holding section 6 of the aligning device 2 from the inner side in the radial direction. FIG. 14A is a front perspective view showing the configurations of the rotating part 633 and flat part 634 of the holding section 6 of the aligning device 2. FIG. 14B is a rear perspective view showing the configurations of the rotating part 633 and flat part 634 of the holding section 6 of the aligning device 2.

As shown in FIGS. 13, 14A and 14B, the rotating part 633 is integrally formed with a motor 636 described later and a housing 637 in which the output shaft thereof (rotation axis Y) is inserted. The rotating part 633 thereby becomes rotatable between the first hook part 631 and second hook part 632, about the rotation axis Y, which is substantially parallel with these hook parts. During operation, the rotating part 633 abuts another lateral face 11B of the one leg of the first coil element 11, and another lateral face 12B of the one leg of the second coil element 12.

The rotating part 633 is formed in an elliptical column shape the extends in the direction of the rotation axis Y. The minor axis of the rotating part 633 is set so that a space on an order that the one leg of each coil element is insertable between the rotating part 633 and the inner face of each hook part is ensured when the major axis direction of the rotating part 633 is made a substantially vertical direction.

In addition, the rotating part 633 is made so that the diameter thereof becomes somewhat smaller towards the leading end side (flat part 634 side).

Therefore, by defining the major axis direction of the rotating part 633 as a substantially vertical direction, a sufficient space for inserting one leg of the first coil element 11 between the first hook part 631 and the rotating part 633 is ensured. Similarly, a sufficient space for inserting one leg of the second coil element 12 between the second hook part 632 and rotating part 633 is ensured.

On the other hand, by causing the rotating part 633 to undergo predetermined angle rotation from this state (Both clockwise and counter-clockwise are possible, for example, rotation so that the orientation of the flat part 634 becomes about 38 degrees from the horizontal direction. The same applies hereinafter.), the space between the first hook part 631 and rotating part 633 is sufficiently narrowed, and the one leg of the first coil element 11 is gripped between these. Similarly, the space between the second hook part 632 and rotating part 633 is sufficiently narrowed, and the one leg of the second coil element 12 is gripped between these.

It should be noted that the rotational action of the plurality of rotating parts 633 is cyclically controlled by controlling a plurality of the motors 636 by way of a controller that is not illustrated.

The flat part 634 is provided to a leading end of the rotating part 633, and extends a predetermined length from the rotating part 633 to both outer sides in the major axis direction thereof. In other words, the flat part 634 is joined with the rotating part 633 at the central part thereof.

In addition, a plane 634A on the rotating part 633 side of the flat part 634 is formed in a tapered shape sloping to the rotating part 633 from the outer side towards the inner side. In other words, the flat part 634 is formed so that the thickness thereof becomes thinner to the outer side. The flat part 634 thereby rotates along with the rotating part 633, and the tapered plane 634A abuts a front face 11C of the one leg of the first coil element 11 and a front face 12C of the one leg of the second coil element 12 to press the these front faces, whereby each coil element is pushed more to an interior side of each hook part, and is more strongly gripped.

It should be noted that the extending length of the flat part 634 is set on an order so that, when the rotating part 633 rotates the aforementioned predetermined angle, the tapered plane 634A abuts the front face 11C of the one leg of the first coil element 11 and the front face 12C of the one leg of the second coil element 12, and can sufficiently press these front faces.

It should be noted that, as shown in FIG. 13, in an inner face 631A of the first hook part 631 and an inner face 632A of the second hook part 632, concave parts indented towards the outside are formed, and anti-skid urethane rubber 631B, 632B is mounted to the concave parts thereof. It thereby becomes possible to more reliably grip and hold one leg of each of the first coil element 11 and second coil element 12.

Figure 15:
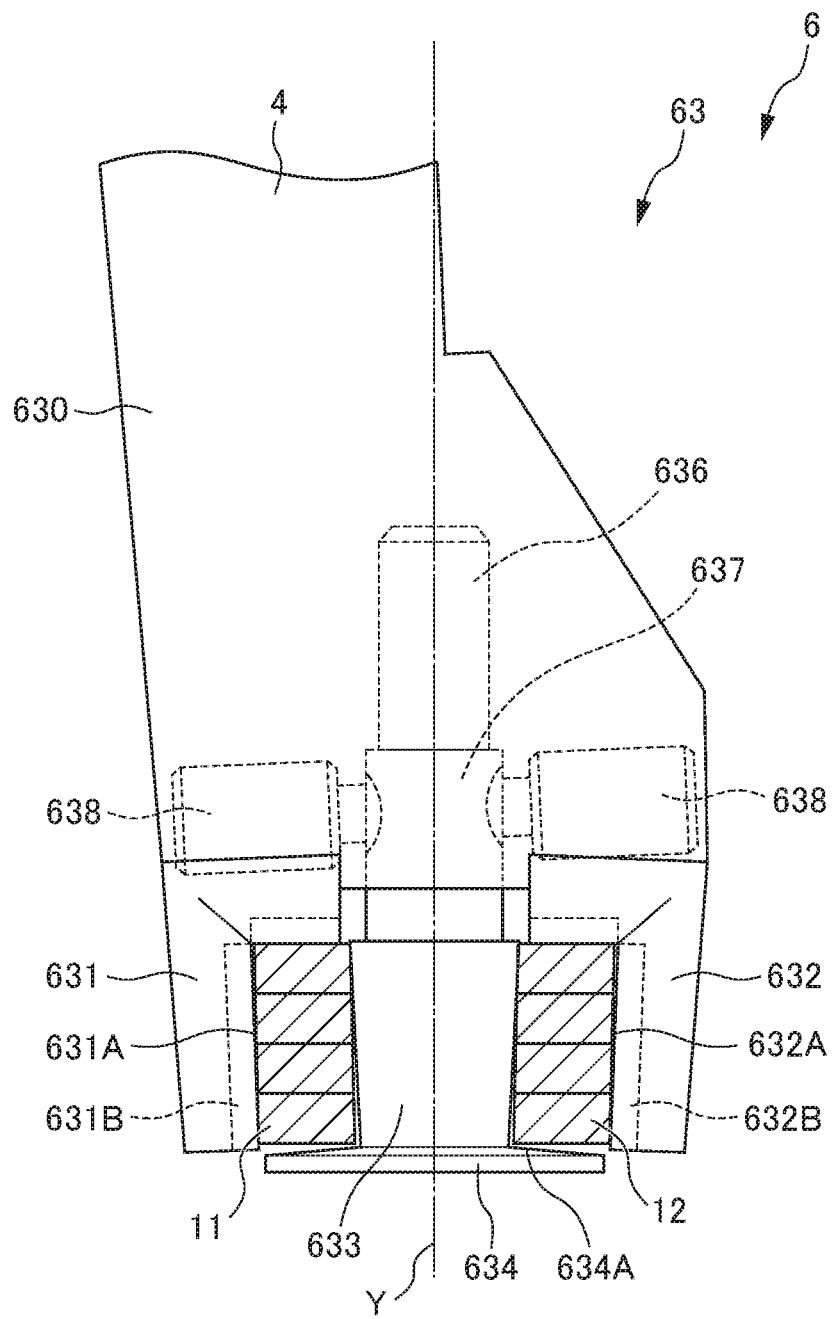
FIG. 15 is a plan view of the holding section according to the second embodiment.

FIG. 15 is a plan view of the holding section 6 of the aligning device 2. In more detail, it is a plan view showing a state when one leg of the first coil element 11 and one leg of the second coil element 12 are gripped by causing the rotating part 633 to undergo predetermined angle rotation from a state setting the major axis direction of the rotating part 633 as a substantially vertical direction.

As shown in FIG. 15, within the central part of the holding section main body 630, the motor 636 and the housing 637 in which the output shaft (rotation axis Y) of the motor 636 is inserted are provided. In addition, within both side parts of the holding section main body 630, fixing parts 638, 638 that fix the output shaft by fixing the housing 637 from the side are provided. The rotating part 633 and flat part 634 rotate about the rotation axis Y by way of driving of the motor 636.

The operation of the aligning device 2 according to the present embodiment is the same as the aligning device 1 according to the first embodiment, except for the operation of the holding section 6.

The holding section 6 according to the present embodiment grips and holds one leg of each of the first coil element 11 and second coil element 12 by operating as follows.

First, in a state in which the entirety of the plurality of holding sections 6 retracts to separate to the outer side in the radial direction, the motor 636 is made to drive to make the rotating part 633 rotate so that the major axis of the rotating part 633 becomes a substantially vertical direction. A sufficient space for inserting one leg of the first coil element 11 between the first hook part 631 and rotating part 633 is thereby ensured. Similarly, a sufficient space for inserting one leg of the second coil element 12 between the second hook part 632 and rotating part 633 is ensured. In addition, at this time, the extending direction of the flat part 634 similarly becomes a substantially vertical direction.

Next, the one leg of the first coil element 11 is inserted between the first hook part 631 and rotating part 633. In addition, the one leg of the second coil element 12 is inserted between the second hook part 632 and rotating part 633.

After insertion, the rotating part 633 is made to undergo predetermined angle rotation by driving the motor 636. The space between the first hook part 631 and rotating part 633 is thereby sufficiently narrowed, whereby the one leg of the first coil element 11 is gripped between these. Similarly, the space between the second hook part 632 and rotating part 633 is sufficiently narrowed, whereby the one leg of the second coil element 12 is gripped between these.

In addition, at this time, the flat part 634 also rotates along with the rotating part 633, and abuts the front face 11C of the one leg of the first coil element 11 and the front face 12C of the one leg of the second coil element 12 from outside portions of the tapered plane 634A, and the inside portion abuts these front faces to press these front faces more as rotation progresses. Each coil element is thereby pushed more into the interior, and more strongly gripped.

It should be noted that, after aligning each of the coil elements in an annular shape, upon inserting the legs of each of the coil elements into the respective slots of the stator core 15 arranged below the circular hole 35, the motor 636 is made to drive to cause the rotating part 633 to rotate so that the major axis direction of the rotating part 633 becomes a substantially vertical direction. By the space between the second hook part 632 and rotating part 633 being sufficiently spread along with the space between the first hook part 631 and rotating part 633 being sufficiently spread, the one leg of each of the first coil element 11 and second coil element 12 being gripped are thereby released.

In addition to the effects of the aligning device 1 according to the first embodiment, the following effects are exerted by the aligning device 2 according to the present embodiment.

With the present embodiment, along with using the first coil element 11 and second coil element 12 which differ in shape from one another as electrical conductors, one leg of the first coil element 11 and one leg of the second coil element 12 are defined as a group, and this is held by the respective holding sections 6.

Along with being able to more densely overlap the coil elements by using two types of coil elements which differ in shape from one another, by holding the one leg of each of the two types of coil elements by the respective holding sections 6 as a group, it is thereby possible to reduce the number of holding sections 6 compared to a case of providing a holding section for every coil element. As a result thereof, in addition to being able to avoid interference between holding sections 6, and being able to align the coil elements in an annular shape reliably, the device can be reduced in size.

However, for example, in the case of holding by sandwiching the leg of a coil element from two directions by way of the biasing force of a spring, in addition to not being able to release as a matter of course, it is necessary to insert and slide the leg between the sandwiching faces upon sandwiching. For this reason, in the case of using coil elements made by bundling a plurality of elastic bodies having a large coefficient of friction, there is risk of the shape variation of coil elements not being able to be compensated, and thus not being able to reliably hold.

In addition, when trying to pinch the leg of a coil element from four directions, for example, it is necessary to provide a separate drive mechanism, and thus the holding sections increase in size. In this case, holding sections interfere with each other upon aligning, and thus it is not possible to align the electrical conductors. Furthermore, when trying to release, an open/close mechanism by a drive source becomes especially necessary, and thus the holding section increases in size.

In contrast, with the present embodiment, along with providing to the holding section 6 the first hook part 631 that abuts one lateral face 11A of one leg of the first coil element 11 and the second hook part 632 that abuts one lateral face 12A of one leg of the second coil element 12, the rotating part 633 that is rotatable about the rotation axis Y which is substantially parallel to these hook parts, and abuts the other lateral face 11B of the one leg of the first coil element 11 and the other lateral face 12B of the one leg of the second coil element 12 is provided to the holding section 6 between these hook parts. In addition, this rotating part 633 is formed in an elliptical columnar shape that extends in the rotation axis Y direction.

It is thereby possible to change the space between the rotating part 633 and the first hook part 631 and the space between the rotating part 633 and the second hook part 632 by the elliptical column-shaped rotating part 633 rotating, whereby holding and releasing the legs of the respective coil elements is possible. In more detail, since the reduction and expansion of these spaces is possible simultaneously, the leg of the first coil element 11 and the leg of the second coil element 12 can be held and released simultaneously. Therefore, according to the present embodiment, along with being able to reliably hold a coil element with a strong force by way of a simple structure, this can be released thereby. In addition, the holding sections 6 can be reduced in size, and thus the aligning device 2 can be reduced in size.

In addition, with the present embodiment, the flat part 634 that extends from the rotating part 633 to both outer sides in the major axis direction thereof is provided to the leading end of the rotating part 633. In addition, the plane 634A on the rotating part 633 side of the flat part 634 is formed in a tapered shape so as to slope to the rotating part 633 side from the outer side towards the inner side.

When the flat part 634 rotates along with the rotating part 633, it thereby abuts the front face of each of the coil elements from an outside portion of the plane 634A on the rotating part 633 side of the flat part 634, and the inside portion abuts the front face of each of the coil elements more as rotation progresses. At this time, since the plane 634A on the rotating part 633 side of the flat part 634 is formed in a tapered shaped so as to slope to the rotating part 633 side from the outer side towards the inner side, it is possible to push each coil element more to the interior of the concave part by pressing the front face of each of the coil elements, and thus each of the coil elements can be held more strongly. Consequently, displacement of the holding positions of the coil elements can be adjusted.

Third Embodiment

Figure 16:
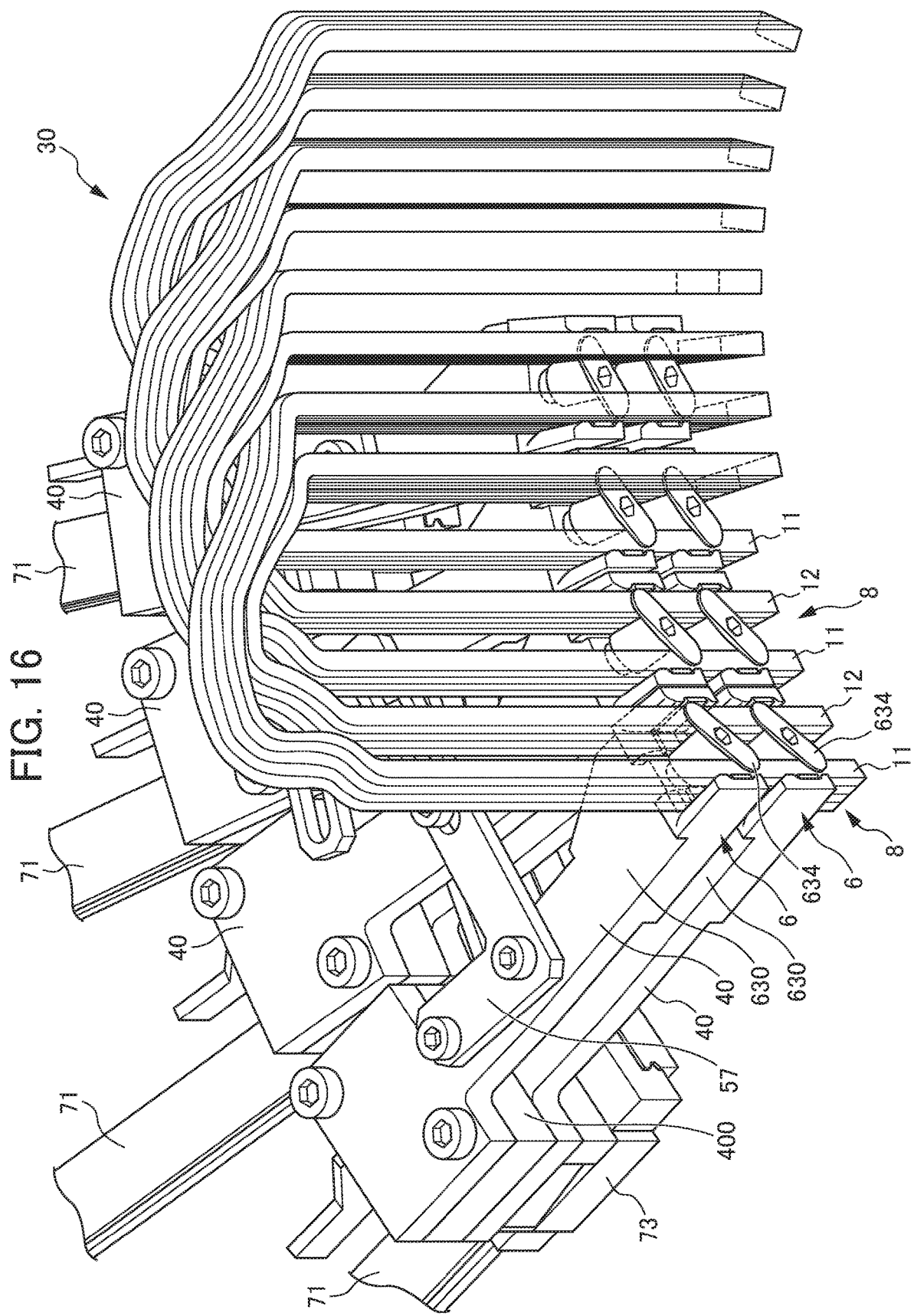
FIG. 16 is a perspective view of holding sections and first coil elements and second coil elements held by the holding sections according to a third embodiment of the present invention.

An aligning device 30 according to a third embodiment of the present invention is the same configuration as the second embodiment, except for the configuration of the holding sections differing from the second embodiment. Herein, FIG. 16 is a perspective view of a holding section 8 and the first coil element 11 and second coil element 12 held by the holding section 8 according to the third embodiment. In addition, FIG. 17 is a perspective view of the holding section 8 according to the third embodiment when the first coil element 11 and second coil element 12 held by the holding section 8 are released.

Figure 17:
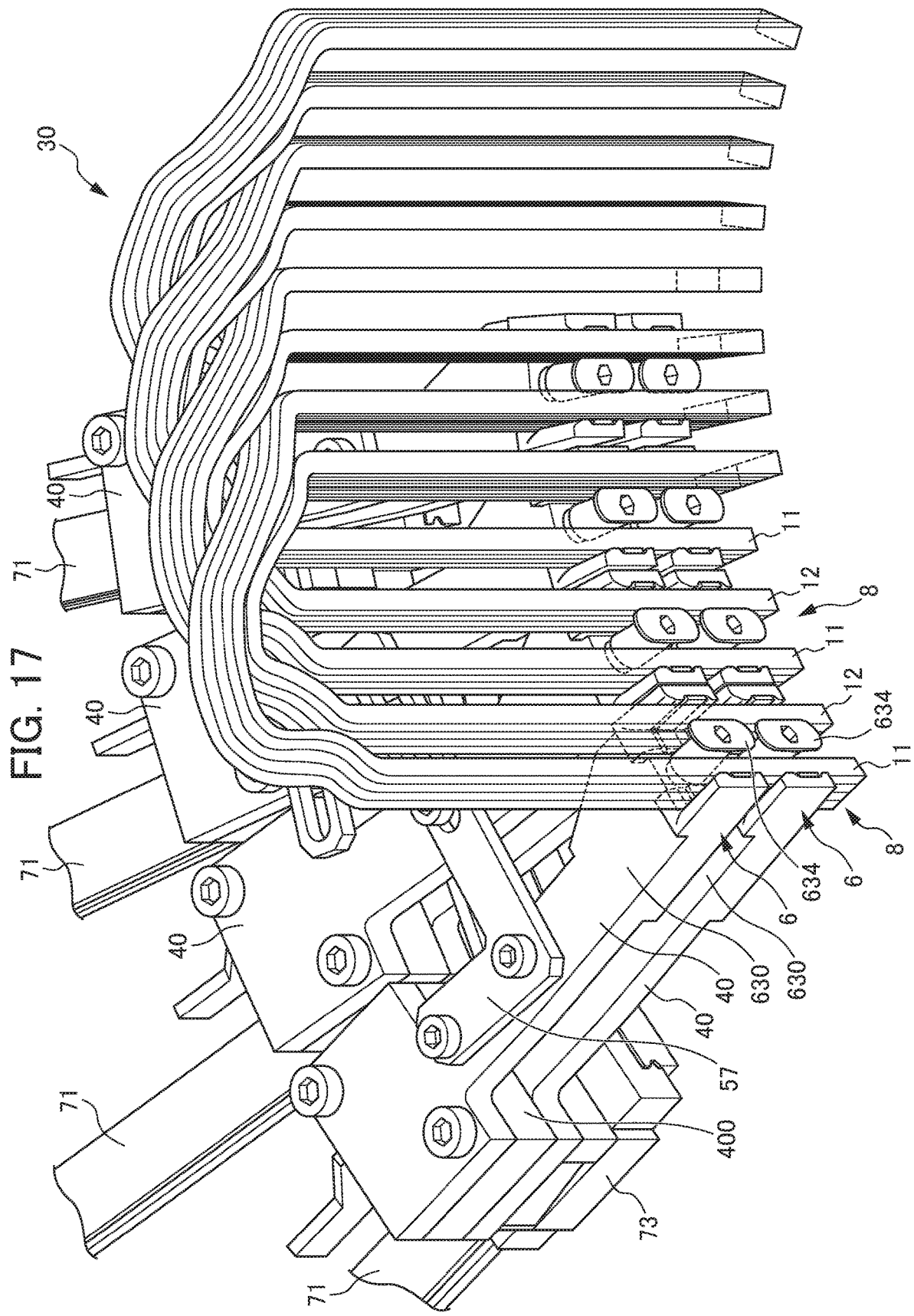
FIG. 17 is a perspective view of the holding sections according to the third embodiment of the present invention when the first coil elements and second coil elements held by the holding sections are released.

As shown in FIGS. 16 and 17, the holding section 8 of the aligning device 30 according to the present embodiment corresponds to a part in which two of the holding sections 6 of the second embodiment are provided vertically in two stages to the respective slide mechanisms 7, 7A. The holding sections 6, 6 provided vertically in two stages are integrally molded with the respective connection parts 40, 40, and the base end sides of these connection parts 40, 40 are connected via an intermediate member 400. With the present embodiment, it thereby becomes possible to hold the legs of coil elements stably since the legs are gripped by the vertical two stages of holding sections 6, 6.

In addition, the vertical two-stages of holding sections 6, 6 are respectively arranged to mutually match with adjacent vertical two-stages of holding sections 6, 6 in the horizontal direction. Herein, since the width dimension is relatively large with the holding section 5 of the first embodiment, it is necessary to arrange the second upper holding section 53 and second lower holding section 55 to be alternately displaced in the height direction in order to avoid interference between adjacent hook parts. In contrast, since the width dimension is small with the holding section 6 of the second embodiment, it becomes possible to arrange the vertical two-stage holding sections 6, 6 to mutually match with adjacent vertical two-stage holding sections 6, 6 in the horizontal direction, as in the present embodiment.

It should be noted that, as shown in FIG. 17, the flat parts 634, 634 provided in the vertical two stages are extended at a length so that there is no mutual interfering when the orientation of each flat part (extending direction) is set to a substantially vertical direction. Holding and releasing of the coil elements thereby becomes possible in a state in which the plurality of holding sections 8 meets.

The aligning device 30 according to the present embodiment operates similarly to the aligning device 2 according to the second embodiment, and thus the same effects are exerted thereby.

It should be noted that the present invention is not to be limited to the above-mentioned embodiments, and modifications and improvements of a scope that can achieve the objects of the present invention are encompassed by the present invention.

For example, with the above-mentioned embodiments, coil elements for a rotating electric machine are employed as the electrical conductors; however, it is not limited thereto, and may be any electrical conductor molded in a substantially U-shape.

In addition, although the one type of the coil element 10 is used in the first embodiment, and the two types of the first coil element 11 and second coil element 12 are used in the second embodiment, it is not limited thereto. For example, these coil elements can be employed in any of the embodiments, and it is possible to employ more types of coil elements in any of the embodiments.

In addition, although two cylinder mechanisms are provided, and two first holding sections 51 (61) are provided corresponding to these in the above-mentioned embodiments, the number of cylinder mechanisms and first holding sections 51 (61) are not particularly limited.

The invention claimed is:

1. An electrical conductor aligning method of aligning a plurality of electrical conductors in an annular shape while overlapping in a circumferential direction, the method comprising:

an arranging step of arranging the plurality of electrical conductors in an annular shape at an interval so as not to overlap in a circumferential direction, by holding one leg of each of the electrical conductors with a plurality of holding sections; and an aligning step of aligning the plurality of electrical conductors in an annular shape while overlapping in the circumferential direction, by causing the plurality of electrical conductors arranged in the annular shape to move to an inner side in the radial direction while holding one leg of each of the electrical conductors so as not cause interference between adjacent holding sections.

2. The electrical conductor aligning method according to claim 1, wherein the plurality of holding sections is arranged so that the positions of adjacent holding sections are alternately displaced in the central axis direction of a ring formed by the plurality of holding sections thereby holding the one leg of each of the electrical conductors so as to be alternately displaced in the central axis direction of the ring.

3. The electrical conductor aligning method according to claim 1, wherein the plurality of holding sections hold a leg of a coil element by slidably sandwiching a leading end side of each hook part and a projecting part of the plurality of holding sections inbetween, so that the hook part is pushed to spread outwards.

4. The electrical conductor aligning method according to claim 1, wherein the plurality of holding sections move along a slide rail that extends in the radial direction.

5. The electrical conductor aligning method according to claim 1, wherein the plurality of electrical conductors is comprised of a first electrical conductor and a second electrical conductor of a different shape from the first electrical conductor, and wherein the aligning step is performed by respectively holding one leg of the first electrical conductor and one leg of the second electrical conductor utilizing the plurality of holding sections that hold the electrical conductors.

6. The electrical conductor aligning method according to claim 1, wherein the arranging step is performed by inserting legs of the plurality of electrical conductors into the space ensured between the legs and the holding sections to enable insertion of the legs thereto, and then narrowing the space thereby gripping the legs by the holding sections inbetween.

7. The electrical conductor aligning method according to claim 1, wherein the aligning step is performed by pushing the plurality of electrical conductors to an interior of a concave part of the holding sections after the holding sections hold the plurality of electrical conductors.

* * * * *